United States Patent Office 3,426,120
Patented Feb. 4, 1969

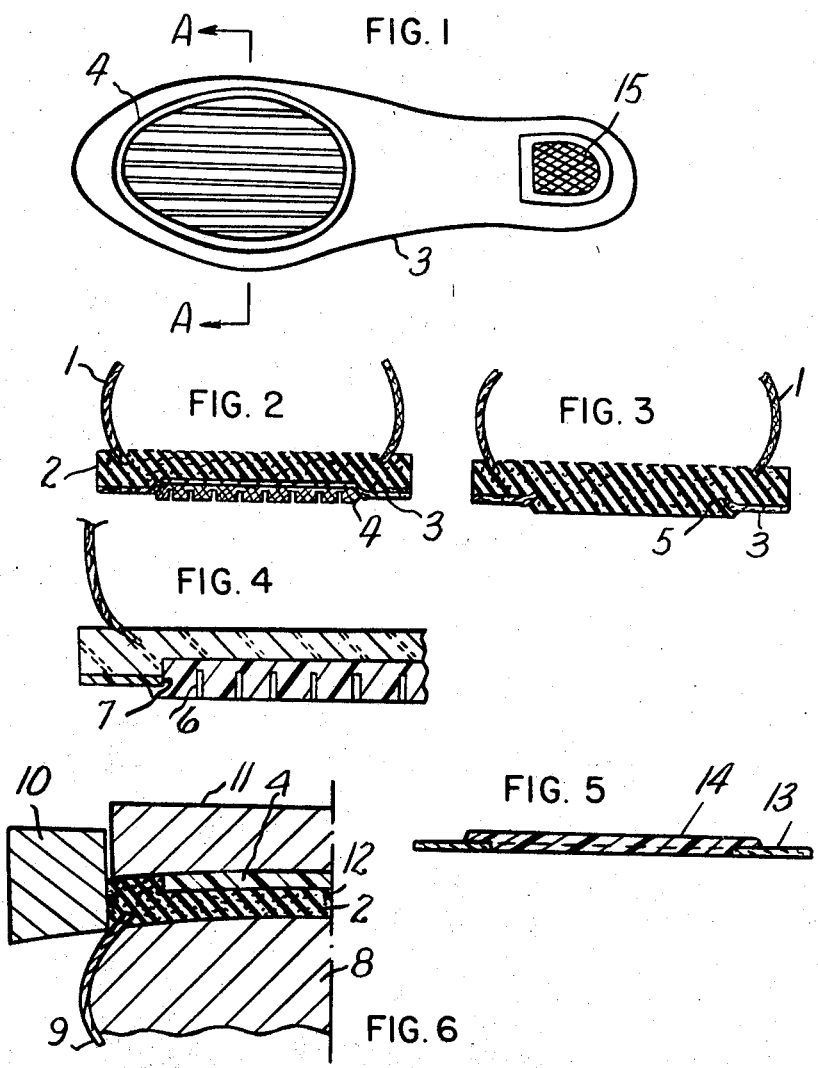

3,426,120
METHOD OF MANUFACTURE OF FOOTWEAR HAVING ANTI-SKID SOLES
Andrew Szerenyl and Anton Liebscher, Waynesville, N.C., assignors to Ro-Search, Incorporated, Waynesville, N.C.
Original application July 22, 1963, Ser. No. 296,534, now Patent No. 3,295,230, dated Jan. 3, 1967. Divided and this application Aug. 2, 1965, Ser. No. 485,142
U.S. Cl. 264—244        1 Claim
Int. Cl. A43d 65/00

ABSTRACT OF THE DISCLOSURE

Method of manufacturing shoes wherein a lasted upper and elastomeric material are placed into a mold and pressure is applied only for a time sufficient to cause the elastomeric material to flow and assume the approximate shape of the mold but insufficient to completely cure the same after which a non-flowable tread sole insert is placed on top of the elastomeric material and pressure is again applied to cure the elastomeric material without substantial flow thereof so that the tread sole insert is maintained in its proper position within the mold and is embedded in the sole and the sole is bonded directly to the upper.

---

This application is a division of our application, Ser. No. 296,534, filed July 22, 1963, now Patent No. 3,295,-230, issued Jan. 3, 1967.

The invention refers to anti-skid soles, as used mostly for outdoor footwear. Such soles, often of natural or synthetic elastomeric material, are customarily provided with ribs, etc., in a configuration to increase the friction between the tread surface of the sole and the ground on which the wearer of the footwear moves.

One object of the invention is to provide an anti-skid tread sole without ribs or similar configurations while at the same time improving the skid resistance of the tread surface.

Another object of the invention is a simplified method for the manufacture of anti-skid soles which reduces the costs thereof.

Other objects of the invention and its realizations are clarified hereinafter in connection with the drawings.

FIGURE 1 shows a view of the sole of a shoe showing layer-inserts in the forepart of the sole, as well as in the heel;

FIGURE 2 shows a cross section of the sole along the line A—A of FIGURE 1;

FIGURE 3 shows a similar cross section through an anti-skid sole according to another execution of the invention;

FIGURE 4 shows in a larger scale part of a cross section through a sole having narrow slits in the layer-insert of the tread sole;

FIGURE 5 shows also in cross section still another execution of a tread sole with an anti-skid layer-insert;

FIGURE 6 shows in cross section part of a mold as can be used advantageously for the method of molding soles according to the invention.

In the realization of the invention shown in FIGURES 1 and 2, the sole 2 is provided with a tread sole 3, which, in this example, is connected to the upper 1 by molding and vulcanizing in situ a mix for a midsole 2 of porous rubber. In the forepart of the tread sole the invention provides a layer-insert 4 of elastomeric material much softer than the wear-resisting remaining part of the tread sole 3. If the tread sole consists of leather, the anti-skid layer 4 might be rubber with a Shore hardness of 50 to 60, or if the tread sole consists of pre-vulcanized rubber of Shore hardness 80, it is advisable to use for the anti-skid insert elastomeric material with only 30 to 50 Shore hardness. When synthetic elastomeric material is used for the tread sole as well as for the layer-insert, both might be selected as identical types of material, as long as the formulation for each part provides for the tread sole a much harder, and for the layer-insert a much softer grade.

The anti-skid effect of the sole according to the invention is assured, if the layer-insert is not only soft, but extends at least in the ball section of the tread surface over most of its width. It has further been found of advantage to let the layer-insert project from the remaining tread surface by some small amount, perhaps ⅛ of an inch, so as to assure that the pressure from the foot of the wearer is exerted against the anti-skid surface.

Further improvement is obtained by providing in the anti-skid layer-insert narrow slits such as shown at 6 in FIGURE 4. Such slits should be as narrow as ease of manufacture allows, perhaps 1/32 of an inch, when produced by molding of an elastomeric mix in a suitable mold. The depth of the slits should always be a multiple of their width, as also their spacing should be a multiple of their width. Such proportions give a high anti-skid effect and at the same time acceptable wear resistance and avoidance of collecting sand or mud in the sole. By filling the slits with highly deformable porous elastomeric material, a sole can be obtained which presents a smooth surface to the outside and can easily be wiped dry on the usual door mat while still presenting a highly effective anti-skid feature.

In some instances it might be sufficient to provide the wear surface of the tread sole with a relatively thin anti-skid layer, extending over the ball portion of the tread sole, applied as strips in the indicated area. In most instances it is preferred to provide anti-skid inserts as heavy as the tread sole itself or heavier, and to provide anti-skid layer-inserts also in the heel part of the sole, as indicated in FIGURE 1.

As shown in FIGURE 1, the slits in the layer-insert 4 are arranged in a longitudinal direction, as this has been found highly effective. Sometimes, as shown at 15 in FIGURE 1, there might be more than one series of slits. They are then arranged so that slits of one series cross the silts of another series. For ease of manufacture the slits might be arranged to be parallel to each other in each series, and curving of each slit and spacing in accordance with the pressure distribution over the ball part of the sole during walking would be preferred.

As shown in FIGURE 2, the layer-insert 4 might be located mostly in a hollow of the tread sole 3. Savings can be obtained by providing in the tread sole a cut-out roughly corresponding to the size of the layer-insert 4. The inner edges might be, as shown in 5 in FIGURE 3 fully embedded in the material of the midsole 2. This material will expand beyond the cut-out so as to form the soft layer-insert. If the pre-molded insert is provided, as shown in FIGURE 4, a shoulder 7 is molded in the insert for the location and bonding of the edge of the cut-out.

When using tread soles of leather, it is of advantage, as shown in FIGURE 5, to mold the layer-insert 14 to the tread sole 13 prior to the placing of the tread sole into the mold customarily used to unite the tread sole by means of a curable midsole to the upper.

FIGURE 6 shows such mold in cross section. Here the upper 9 is mounted on the last 8 and a frame 10 usually divided, is placed against the edge of the upper. A sole bottom plate 11 serves to close the cavity 12 and to exert pressure. The material for the sole 2 is placed into the cavity before closing together with the previously prepared insert, or with a tread sole as previously described. The sole materials are then molded and cured to produce a unified sole bonded to the upper.

When using a pre-molded layer-insert, and using an inverted mold, as shown in FIGURE 6, the invention further provides a method which assures the exact location of the layer-insert even if only a smooth sole bottom plate is used without recesses, etc. In such applications the invention provides that the layer-insert is placed into the mold cavity only after an initial, short molding of all other sole material has occurred. After such first molding, which might last only a few seconds, the mold cavity is opened again and the insert placed into the desired location. The mold is then closed and held under heat and/or pressure until the cure of the sole material is completed. As substantially all the flow of sole material is completed in the first molding steps, in the dislocation of the insert—otherwise unavoidable—is prevented. This method allows the use of various sizes of inserts in the same mold, without any alteration of the mold itself.

While in the foregoing examples the use of pressure molding has been described as it is customary for rubber, it is understood that for other material other manufacturing methods, such as slushmolding, might be indicated. The molding of the slits has been described as an inexpensive way of manufacture, but other methods, such as sawing, might be indicated in some applications, as long as the slits are narrow and the opposing sidewalls of the slits are movable in relation to each other, whether these slits are uninterrupted over their entire length or show interruptions.

What is claimed as new and useful is:

1. The method of manufacture of shoes having soles of elastomeric material molded directly to the upper comprising the steps of placing an upper on a last, placing the lasted upper and elastomeric material into an open mold, closing the mold, applying pressure to the elastomeric material only for a duration sufficient for the elastomeric material to flow in and assume the approximate shape of the mold and the approximate shape of the finished sole and mold the elastomeric material to the upper but insufficient to completely cure the elastomeric material, opening the mold, placing a non-flowable tread sole insert on top of said elastomeric material, said insert being smaller than the mold and sole and generally corresponding to the outline of the sole, closing the mold and again applying pressure to cure said elastomeric material without substantial flow thereof so that said tread sole insert is maintained in its initial position within the mold and is embedded in said sole and said sole is bonded directly to said upper.

References Cited

UNITED STATES PATENTS

| | | | |
|---|---|---|---|
| 2,646,380 | 7/1953 | Barlow et al. | 264—132 |
| 1,925,271 | 9/1933 | Miller | 264—273 |
| 2,142,242 | 1/1939 | Greenbaum | 12—146 |
| 2,497,226 | 2/1950 | McNeill | 264—326 X |
| 2,931,110 | 4/1960 | Pietrocola. | |
| 3,014,244 | 12/1961 | Hansjosten | 264—244 X |
| 3,042,975 | 7/1962 | Bingham, et al. | 264—244 |
| 3,137,749 | 6/1964 | Bingham | 264—244 |
| 3,146,285 | 8/1964 | Munk | 264—266 |

FOREIGN PATENTS

| | | |
|---|---|---|
| 642,932 | 7/1962 | Italy. |

ROBERT F. WHITE, *Primary Examiner.*

T. J. CARVIS, *Assistant Examiner.*

U.S. Cl. X.R.

264—275, 273, 45

UNITED STATES PATENT OFFICE
CERTIFICATE OF CORRECTION

Patent No. 3,426,120 February 4, 1969

Andrew Szerenyi et al.

It is certified that error appears in the above identified patent and that said Letters Patent are hereby corrected as shown below:

In the heading to the drawing, line 1 thereof, "A. SZERENYL ET AL" should read -- A. SZERENYI ET AL --. In the heading to the printed specification, line 4, "Andrew Szerenyl" should read -- Andrew Szerenyi --.

Signed and sealed this 24th day of March 1970.

(SEAL)
Attest:

Edward M. Fletcher, Jr.
Attesting Officer

WILLIAM E. SCHUYLER, JR.
Commissioner of Patents